United States Patent [19]

Ishida et al.

[11] Patent Number: 4,940,234
[45] Date of Patent: Jul. 10, 1990

[54] VIDEO GAME MACHINE

[75] Inventors: Nobuaki Ishida; Yoshifumi Ishimura; Hiroshi Murayama, all of Tokyo, Japan

[73] Assignee: Sega Enterprises, Ltd., Tokyo, Japan

[21] Appl. No.: 323,298

[22] Filed: Mar. 14, 1989

[30] Foreign Application Priority Data

Jun. 15, 1988 [JP] Japan .............................. 63-79389[U]

[51] Int. Cl.$^5$ .............................................. A63F 9/14
[52] U.S. Cl. ................................................ 273/1 GA
[58] Field of Search ........... 273/1 GB, 1 GA; 434/63

[56] References Cited

U.S. PATENT DOCUMENTS 3,777,410 12/1973 Robinson .................... 273/1 GA X

FOREIGN PATENT DOCUMENTS 2309739 9/1973 Fed. Rep. of Germany ........ 434/63
1099197 3/1955 France .............................. 273/1 GA Primary Examiner—Paul E. Shapiro
Attorney, Agent, or Firm—Price, Gess & Ubell

[57] ABSTRACT

A video game machine which functions as a simulator. The machine comprises a toy vehicle, a manual control unit permitting a human player to remotely control the vehicle, an optical sensor mounted integrally with the vehicle, and a control which controls the progress of a game according to information supplied from the sensor. The toy vehicle is held so as to be movable along the viewing screen of a television set. The sensor is disposed opposite to the TV screen and monitors the emission of light from the screen portion which is opposite to the sensor.

11 Claims, 14 Drawing Sheets

FIG. 14
FIG. 15
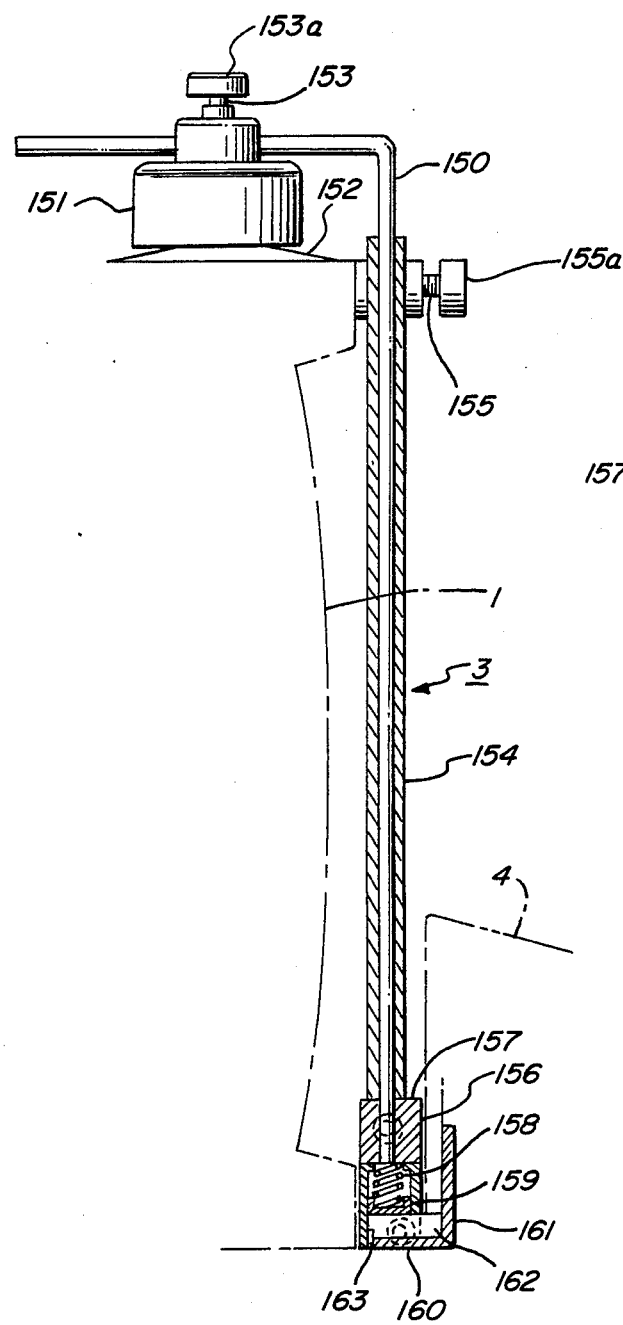
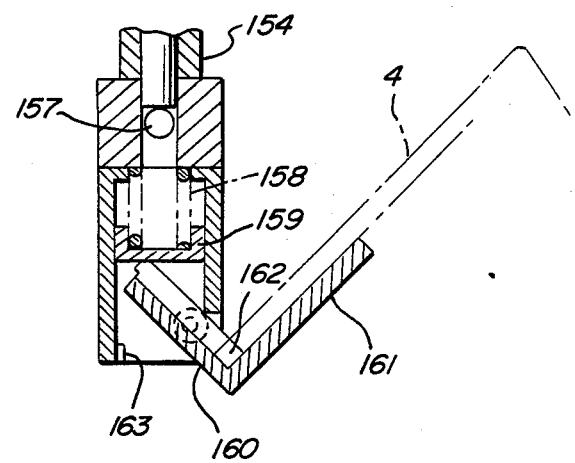

VIDEO GAME MACHINE

BACKGROUND OF THE INVENTION

1. Field of the Invention

The present invention relates to a video game machine which utilizes a television screen and is of the type called a simulator such as a car simulator or flight simulator.

2. Description of the Prior Art

In a conventional video game machine, moving roads and scenes are displayed on a television screen. A vehicle such as a car or airplane is also displayed on the screen. A human player operates a steering wheel and other manual controls installed independent of the TV screen to manipulate the vehicle. Simple video game machines include TV game machines which are widely used in homes. Game machines which display more real scenes on TV screens include drive game machines installed in game machine centers.

One example of such drive game machine is disclosed in Japanese Utility Model Publication No. 13,656/1987 and shown in FIG. 19, where an inclined half mirror 02 is mounted close to a television camera 01 which is movably held. A screen 03 on which an image is projected is installed in front of the mirror 02. The image should be reflected onto the mirror 02. A dummy car 04 whose image should pass through the half mirror 02 is disposed on a belt 05 below the mirror 02.

An intermediate slit 06 is disposed below the screen 03 in a parallel relation to the screen. A rotating drum 07 is disposed below the slit 06. The drum 07 consists of a cylindrical transparent plate made from a synthetic resin, the transparent plate having opaque portions. A light source 08 is mounted inside the drum 07. The image on the rotating drum 07 is projected onto the screen 03 via the intermediate slit 06 to create a moving image.

Thus, the moving image on the screen 03 is reflected by the half mirror 02 and picked up by the TV camera 01. At the same time, the image of the dummy car 04 on the belt 05 is transmitted through the mirror 02 and picked up by the camera 01. As a result, a synthesized image impinges on the camera 01. The image picked up by the camera 01 in this way is projected on the viewing screen of a cathode-ray tube 09.

A steering wheel 010 for operating the dummy car is mounted below the CRT 09. The position and the posture of the camera 01 are changed by operating the wheel 010. A signal produced in response to the operation of the wheel is sent to a control system, which then starts a game.

Accordingly, on the screen of the CRT 09, the dummy car 04 is seen moving against a moving background created on the screen 03. A human player operates the wheel 010 or other manual control while watching the image on the CRT to play the game.

In order to achieve a realistic drive game as described above, a considerably large-scale, and hence expensive, apparatus is needed as shown in FIG. 19. This hinders wide acceptance of such game machines in homes.

Further, the image of a background projected on the screen of the CRT 09 is quite simplified and so it lacks reality. Additionally, the background changes periodically, so that the game tends to be monotonous.

In contrast to this, TV games can be easily played in homes. However, the image displayed on the viewing screen of the TV set is synthesized by combining pixels of a certain size and, therefore, it is far remote from the actual image. Consequently, sufficient reality cannot be obtained. Hence, simulation in which the player feels as if he or she drove an actual car cannot be attained.

SUMMARY OF THE INVENTION

In view of the foregoing, the present invention has been made.

It is an object of the invention to provide a video game machine which finds wide acceptance in homes, gives a real feeling to the human player, and functions well as a sophisticated simulator.

A video game machine according to the invention comprises a toy vehicle held so as to be movable along a TV screen, a manual control means permitting one to remotely control the vehicle, an optical sensor which is opposite to the TV screen integral with the vehicle and detects emission of light from the portion of the TV screen that is opposite to the sensor, and a control means for controlling the progress of a game in response to the output signal from the sensor.

In one feature of the invention, the toy vehicle which is remotely controlled independent of the image on the TV screen is mounted so as to be movable along the TV screen. The optical sensor mounted on the vehicle monitors the condition of the image and causes a game to progress and so a game device that is controlled independent of the image on the TV screen is offered. Accordingly, the game device can be easily mounted on a domestic television set, and a game can be played. Also, any desired image can be formed on the TV screen. It is also possible to play back scenes previously taken from an actual vehicle, by means of a video tape recorder. In this case, the game machine functions as a simulator. That is, the human player feels as if he or she rode in an actual vehicle.

Since the toy vehicle actually exists in front of the TV screen, a feeling of depth, or extent inwards, is given. Therefore, the player is required to manipulate the toy vehicle while taking the length of the vehicle into account. In this way, the video game machine functions as a sophisticated simulator.

BRIEF DESCRIPTION OF THE DRAWINGS

FIG. 14 is a partially cutaway side elevation of one of the joints shown in FIG. 1;

FIG. 15 is a cross-sectional view of main portions of the joint shown in FIG. 14, but in which the joint is in a condition different from the condition shown in FIG. 14;

DETAILED DESCRIPTION OF THE PREFERRED EMBODIMENT

Figure 1:
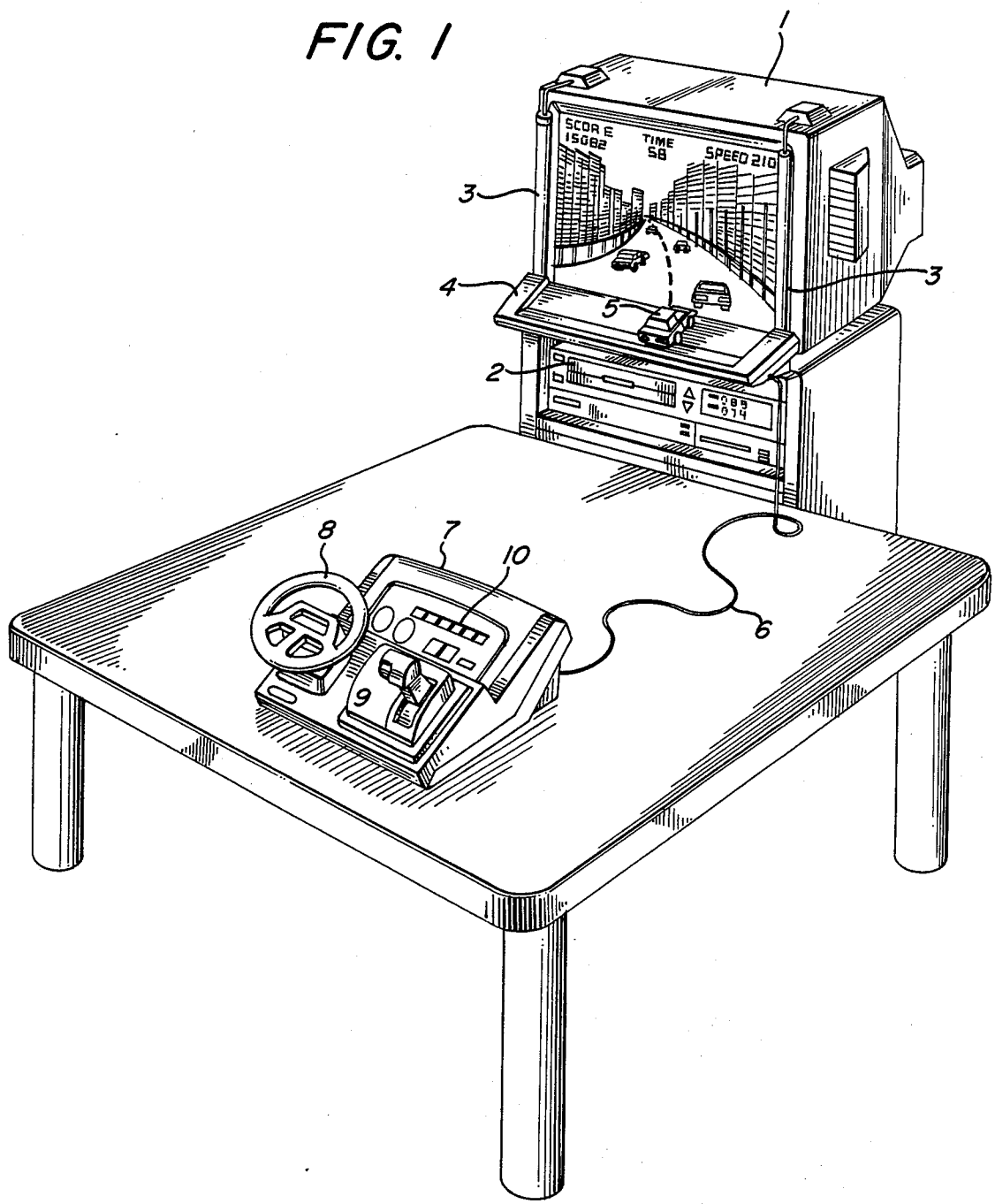
FIG. 1 is a perspective view of a drive game machine according to the invention.

A drive game machine embodying the concept of the invention is shown in FIGS. 1-18. FIG. 1 shows the whole structure of the machine. A domestic television set 1 is equipped with a video tape recorder 2. A pair of joints 3 extends vertically downwardly along both side ends of the viewing screen of the TV set 1. The body of an apparatus 4 depends from the lower ends of the joints 3 and protrudes forwardly. A toy car 5 is mounted on the upper surface of the apparatus body 4 so as to be movable from side to side, the car 5 facing the TV screen. A cord 6 extends from the apparatus body 4 to an independent manual control unit 7 to connect the body 4 with the unit 7. A steering wheel 8, a selector lever 9, etc. are mounted on the manual control unit 7. Further, various display devices 10 are installed on the control unit 7.

A human player operates the wheel 8 and the lever 9 while watching the image of, for example, a road, projected on the screen of the TV set 1, to move the toy car 5 right and left, for playing a drive game.

Figure 2:
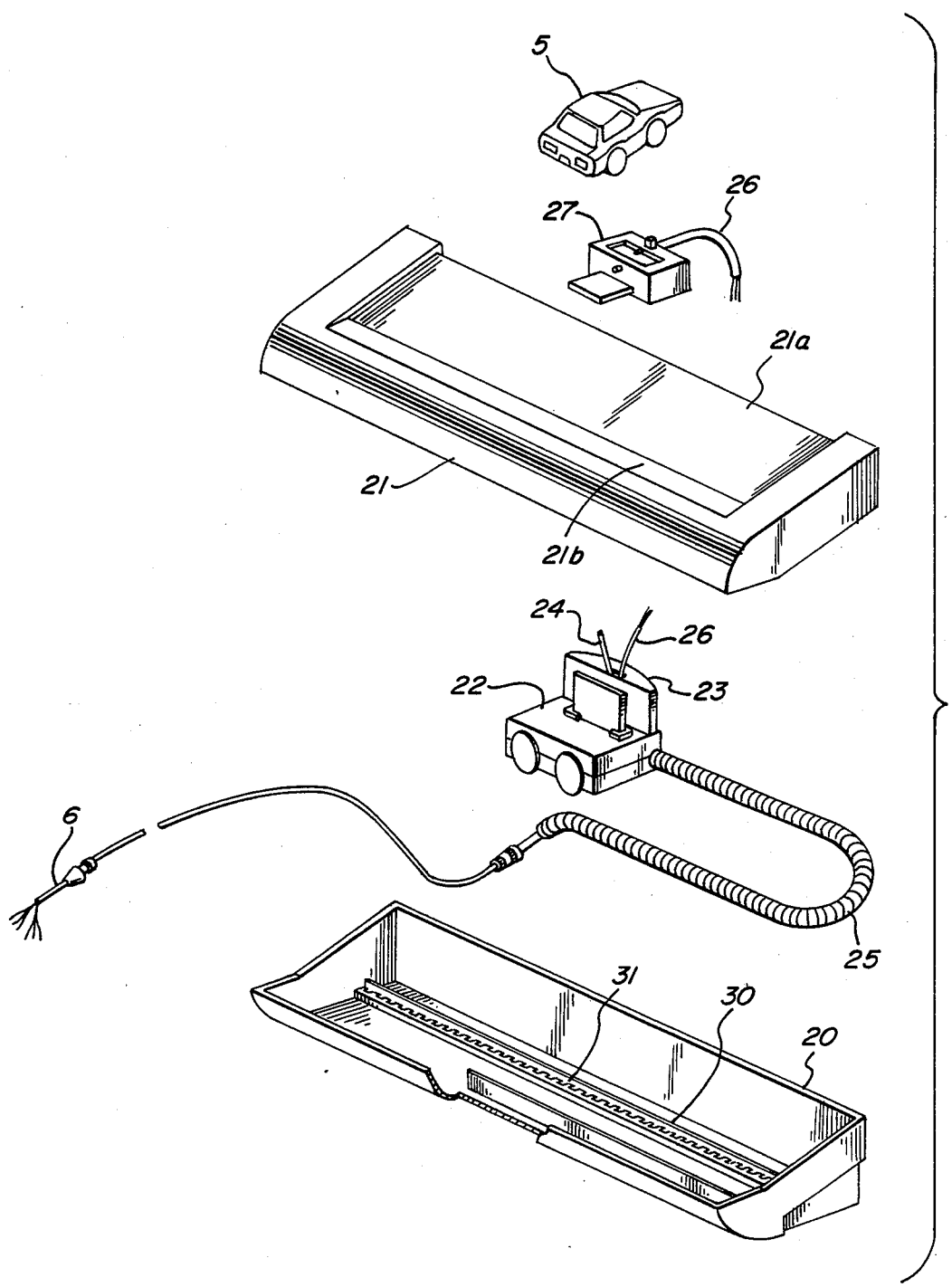
FIG. 2 is an exploded perspective view of the body of an apparatus used in the machine shown in FIG. 1.

The structure of this game machine is now described in detail. FIG. 2 is a perspective view of the body 4 of the apparatus. The body 4 includes a boxlike lower case 20 extending horizontally and an upper case 21 placed on the lower case 20. A carriage 22 is mounted in the space inside the cases 20, 21 so as to be movable right and left. A sensor cover 23 is located in front of the carriage 22 and protrudes slightly forward. The cover 23 is outside the upper case 21 and extends along the front side surface of the case 21. A joint shaft 24 extends upwardly from the top surface of the cover 23, and is inclined rearwardly. A spring cable 25 extends from one side of the carriage 22. A cord 26 extends from the cover 23 at a location close to the shaft 24.

The upper case 21 has an upper, front surface 21a inclined slightly upwardly. The toy car 5 can be moved along the inclined surface 21a by a movable base 27 which is pivotally mounted to the joint shaft 24 extending upwardly from the carriage 22. As the carriage 22 moves from side to side, the car 5 follows it and moves from side to side on the upper case 21.

Figure 3:
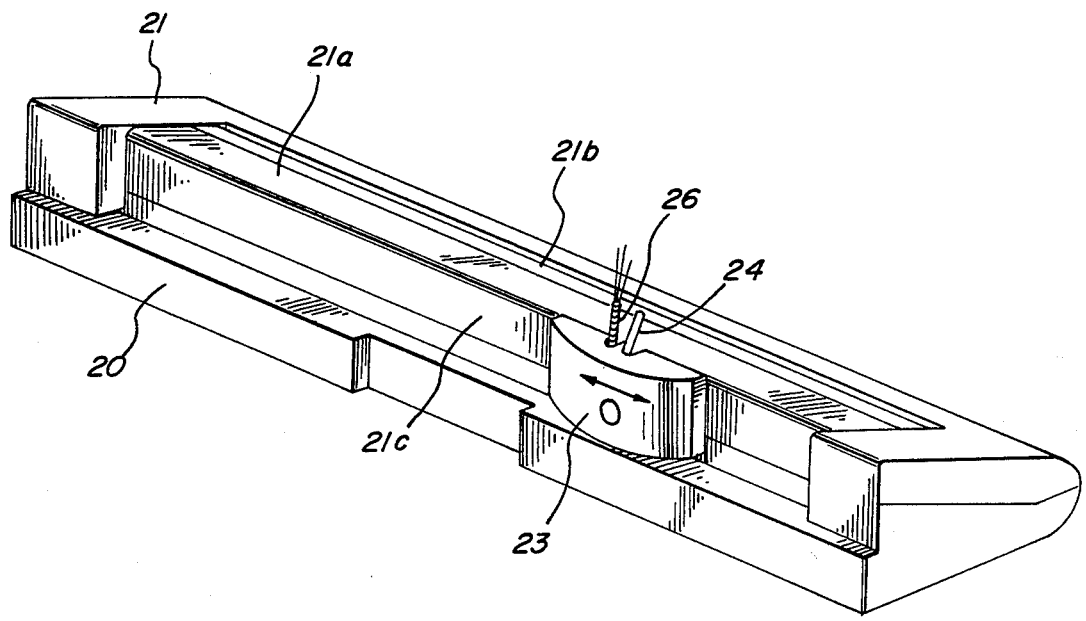
FIG. 3 is a partially cutaway perspective view of the body of the apparatus shown in FIG. 2.

In the condition of FIG. 3, the lower case 20 and the upper case 21 are combined into a unit, and the carriage 22 is fitted in the space inside the unit. The front side surface of the upper case 21 has a recess except for both ends. This recess becomes deeper rearwardly. The lower fringe of a front side surface 21c formed in front of the recess is cut longitudinally to form a cutout. An opening is formed between this cutout and the front side wall of the lower case 20. The sensor cover 23 protruding from the carriage 22 extends through the opening and is exposed. The cover 23 is capable of moving from side to side along the front side surface 21c of the upper case 21.

The mechanism for driving the carriage 22 is now described. As shown in FIG. 2, a guide rib 30 and a rack 31 run horizontally in a parallel relation to each other inside the lower case 20. The carriage 22 is carried on the rib 30 and the rack 31, and has an electric motor mounted thereon. As the motor is driven, the carriage 22 is moved.

Figure 4:
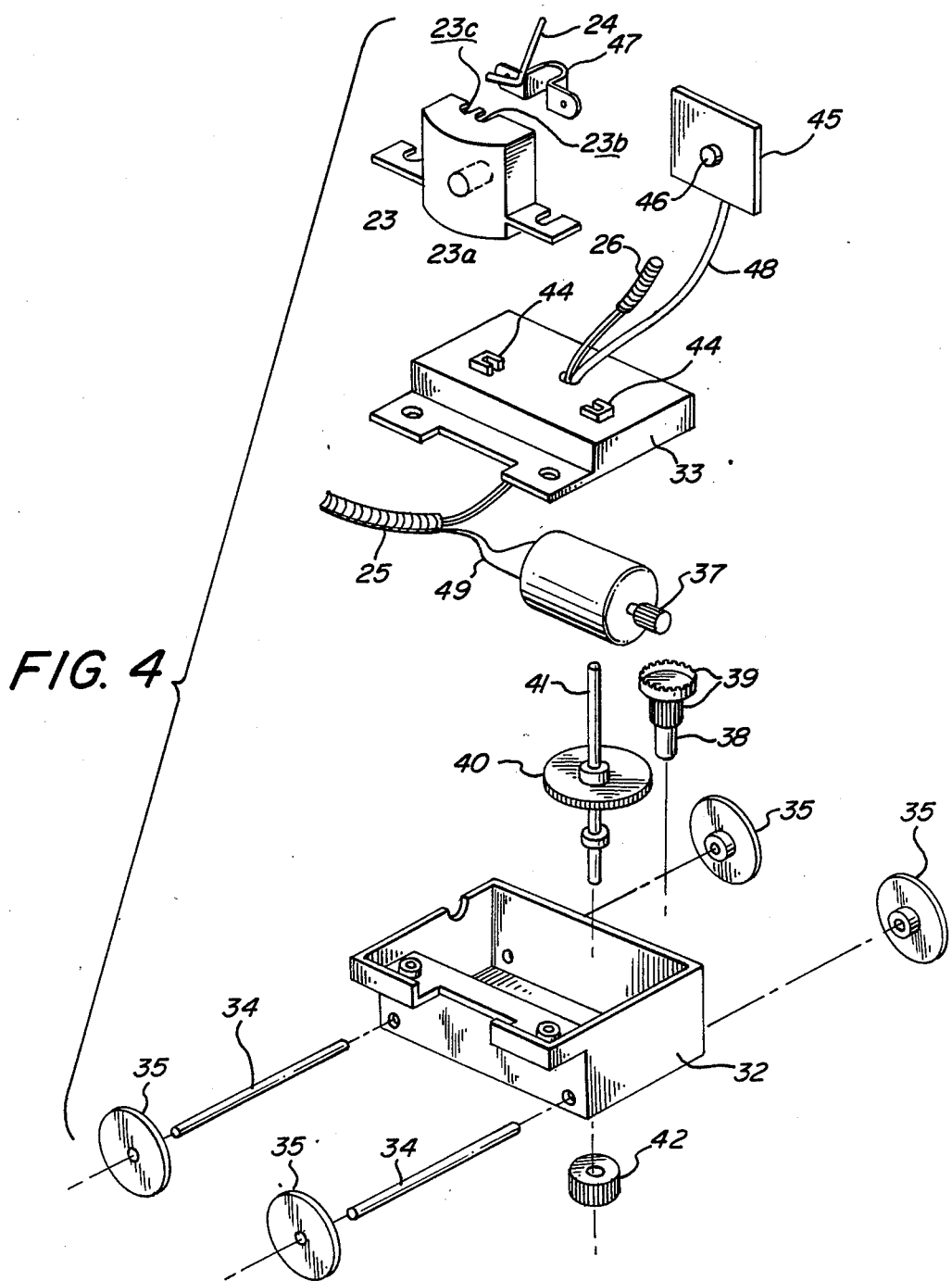
FIG. 4 is an exploded perspective view of a carriage.

FIG. 4 is an exploded perspective view of the carriage 22. The carriage comprises a hollow box which is vertically divided into two cases 32 and 33. A pair of axles 34 extends horizontally. The axles 34 extend through the lower case 32, and are rotatably held by the case 32. Wheels 35 are fitted over the axles 34 at the front and rear ends of the axles 34. Thus, the carriage 22 are carried on the four wheels 35 so as to be movable from side to side.

An electric motor 36 and a gearing are mounted inside the box consisting of the cases 32 and 33. A pinion 37 is fitted over the rotating shaft of the motor 36. A crown gear 39 having a pinion is fitted over a rotating shaft 38 which extends vertically. The crown gear 39 is in mesh with the pinion 37. A spur gear 40 is in mesh with the pinion of the crown gear 39 and fitted over a rotating shaft 41 that extends through a circular hole formed in the lower case 32. The shaft 41 protrudes downwardly from the case 32, and a pinion 42 is fitted over the protruding shaft 41.

After the carriage has been assembled, when the motor 36 is driven, the pinion 42 is rotated below the case 32 via the crown gear 39 having the pinion and via the spur gear 40.

Figure 9:
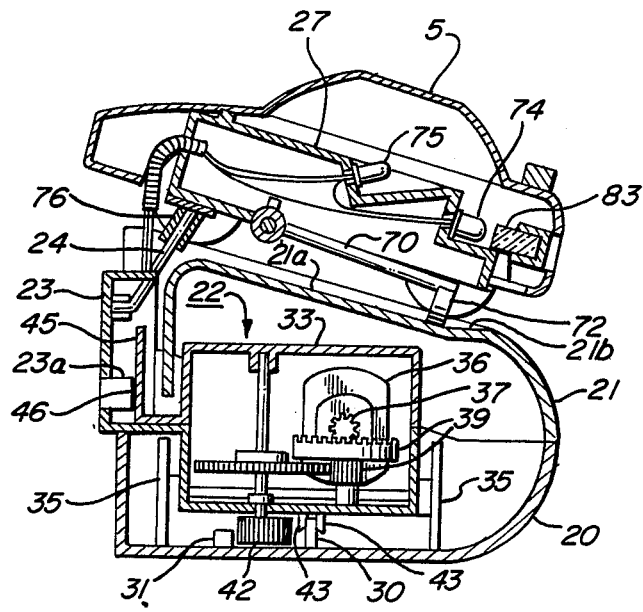
FIG. 9 is a cross-sectional view of the whole apparatus body shown in FIG. 2.

A pair of guiding protrusions 43 is formed on the underside of the case 32 and extends horizontally (FIG. 9). When the carriage 22 is placed in the lower case 20, the guide rib 30 is loosely held between the guiding protrusions 43. The pinion 42 protruding downwardly from the case 32 is in mesh with the teeth on the front side surface of the rack 31. As the pinion 42 is rotated, the carriage 22 is moved from side to side while guided by the guide rib 30. That is, the carriage 22 can be moved from side to side by rotating the motor 36 forwardly or rearwardly.

Symmetrically arranged U-shaped support members 44 protrude from the upper surface of the upper case 33. A sensor base 45 located over the support members 44 is fitted in the support members 44. The front surface of the base 45 is covered with the arc-shaped sensor cover 23.

An optical sensor 46 is rigidly fixed to the front surface of the sensor base 45. The cover 23 has a cylindrical light guide portion 23a which extends rearwardly from an opening formed in the arc-shaped front surface of the cover 23. The guide portion 23a surrounds the optical sensor 46 to impart directivity to the sensor. Accordingly, the sensor 46 can receive only light which comes from the position opposite to the opening in the arc-shaped front surface after passing through the inside of the light guide portion 23a.

The upper wall of the sensor cover 23 has two notches 23b and 23c at its rear fringe. The aforementioned joint shaft 24 is fitted in the notch 23b. The shaft 24 has a base end portion fixed by a fixture 47. The shaft 24 is tilted at an angle of 15° to the vertical. The base end portion of the shaft 24 is bent horizontally to prevent the shaft 24 from coming out of the notch 23b.

The cord 26 described above extends through the notch 23c. A cord 48 extends outwardly through the sensor base 45, and is combined with the cord 48 into a unit which extends through the upper case 33. The composite cord is then combined with a power cord 49 extending from the motor 36 and extends outwardly from the side walls of the cases 32, 33 to form the spring cable 25.

The manual control unit 7 supplies electric power to the motor 36 via the cord 6 and the spring cord 25. Also, the manual control unit feeds electric power to LEDs (described later) on the carriage 27 via the cord 26. The output signal from the optical sensor 46 is fed to the control unit 7 via the cord 48 and the spring cable 25.

Figure 5:
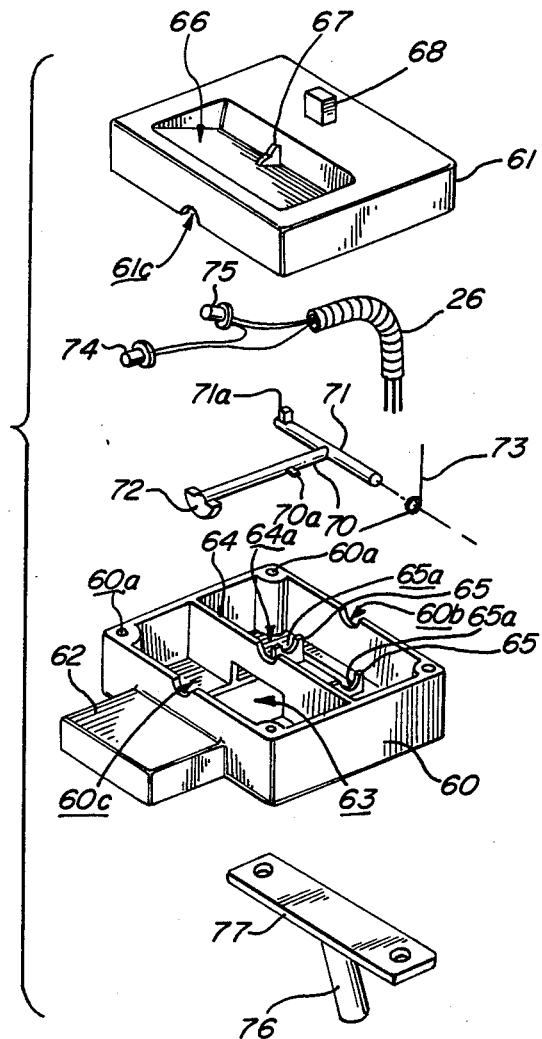
FIG. 5 is an exploded perspective view of a movable base.

The movable base 27 driven by the carriage 22 is now described. FIG. 5 is an exploded perspective view of this base 27. This carriage comprises an upper case 61 and a lower case 60 that is shaped like a box. a friction rod cover 62 protrudes rearwardly from the rear wall of the lower case 60. The cover 62 is comprised of an upper wall, a left wall, a right wall, and a rear wall; the cover has no bottom wall. A space is formed inside the cover. A horizontally extending rectangular hole 63 is formed in the bottom wall of the case 60 and extends through the rear wall into the friction rod cover 62.

Circular holes 60a receiving screws are formed at the four corners of the case 60. Semicircular notches 60b and 60c are formed at the upper fringes of the front and rear walls of the case 60.

A plate 64 extends over the rectangular hole 63 and horizontally inside the case 60. A portion of the inner plate 64 which is close to the hole 63 is removed. A semicircular notch 64a is formed at the upper fringe. Two similar support plates 65 are located opposite to each other and extend upwardly along the side fringes of the rectangular hole 63. The support plates 65 are disposed ahead of the inner plate 64. Semicircular notches 65a are formed at the upper fringes of the support plates 65 and opposite to each other.

The upper case 61 corresponds to the lower case 60 constructed as described above. The upper case 61 has small holes at its four corners, corresponding to the circular holes 60a. Semicircular notches 61b and 61c are formed at the lower fringes of the front and rear walls of the upper case, corresponding to the notches 60b and 60c.

The rear half of the upper wall sinks obliquely to form a wedge-shaped recess 66. A small hole 67 is formed at the boundary between the side wall in front of the recess and the bottom wall of the recess. The hole 67 is in register with the notch 64a formed in the inner plate 64 of the lower case 60.

A rectangular boss 68 protrudes from the upper wall of the case 61 to fix the toy car 5. A friction rod 70 is formed integrally with a rotating shaft 71 to form a T-shaped structure, the shaft 71 consisting of a round rod. A semicircular friction plate 72 is formed at the rear end of the friction rod 70 which has an engaging portion 70a. A stopper 71a protrudes from the shaft 71. The rod 70, the shaft 71, the friction rod 72, the engaging portion 70a, and the stopper 71a are all made from a resin as a unit.

The friction rod 70 is inserted into the rectangular hole 63 in the case 60 from the front side of the inner plate 64. Both ends of the rotating shaft 71 are held in the notches 65a formed in the support plates 65. At this time, a clip spring 73 is fitted over the shaft 71. One end of the spring 73 is anchored to the engaging portion 70a. When the shaft 71 is held in the notches 65a in the support plates 65, the other end of the spring 73 bears on the inner surface of the front wall of the case 60.

Therefore, the friction rod 70 swings up and down about the rotating shaft 71. When the rod 70 is located in the rectangular hole 63 rearwardly of the shaft 71, the friction plate 72 at the rear end of the friction rod 70 is urged downward. The rod 70 is prevented from swinging upward from the horizontal by the inner plate 64. If the rear end of the rod 70 drops, the stopper 71a bears against the fringe of the notch 65a in one support plate 65 to prevent the rear end of the rod 70 from falling more than a given distance.

The cord 26 extending from the carriage 22 is fitted in the notch 60b in the front wall of the case 60, and the end of the cord is disposed inside the case.

LEDs 74 and 75 emitting green light and red light, respectively, are mounted at the end of the cord 26. One LED 74 is fitted in the notch 60c formed in the rear wall of the case 60, while the other LED 75 is fitted in the notch 64a formed in the inner plate 64.

When the case 61 is placed on the case 60, the LEDs 74 and 75 are held in the notch 61c and the small hole 67, respectively, formed in the case 61 such that the LEDs are partially exposed. The cord 26 fitted in the notch 60b formed in the front wall of the case 60 is held in the notch 61b formed in the case 61. A cylindrical rotating boss 76 is mounted to the underside of the lower case 60 and fitted in the joint shaft 24. The boss 76 protrudes from the center of a mounting plate 77 downwardly and forwardly, and is inclined at an angle of 20° to the vertical. The plate 77 is mounted to the underside of the bottom wall of the case 60 at a location close to the front of the bottom wall.

Figure 6:
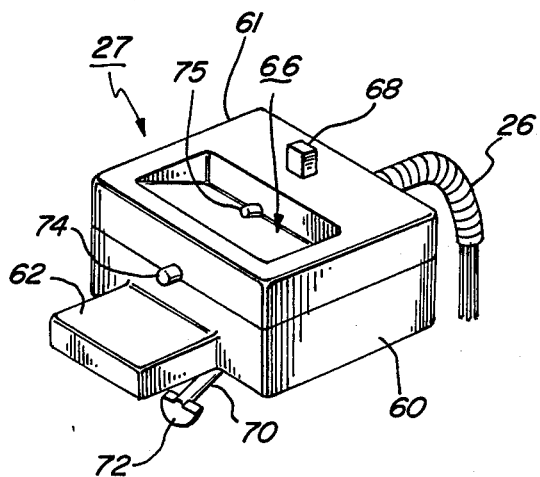
FIG. 6 is a perspective view of the movable base shown in FIG. 5.
Figure 7:
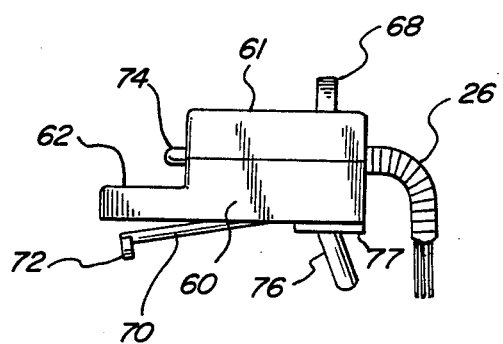
FIG. 7 is a side elevation of the movable base shown in FIG. 6.

FIGS. 6 and 7 show the condition in which these various components have been mounted. The cord 26 enters the housing made of the cases 60, 61 from the front wall. The head of the LED 74 emitting green light protrudes from the rear wall. The head of the LED 75 emitting red light is exposed in the recess 66 formed in the case 61. The friction rod 70 is biased downward by the clip spring 73 below the case 60 and the friction rod cover 62, and is held so as to be swingable. The rotating boss 76 protrudes obliquely downwardly from the underside of the case 60.

Figure 8:
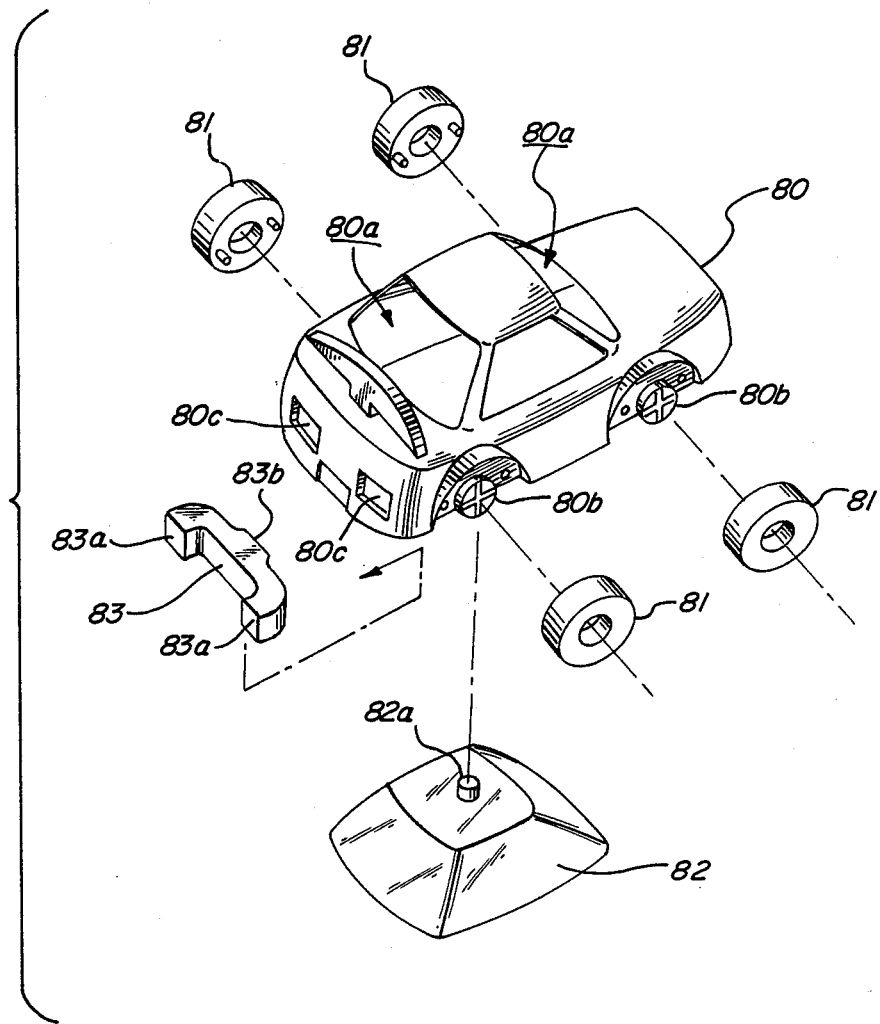
FIG. 8 is an exploded perspective view of the toy car shown in FIG. 1.

The toy car 5 is next described in detail by referring to the exploded perspective view of FIG. 8. The body 80 of the car is entirely molded into the shape of a car out of a material. Portions of the body 80 are removed to form window portions 80a. Rims 80b to which tires 81 are mounted are molded integrally with the body 80.

Two rectangular holes 80c are formed at the tail of the body 80. A windowshield 82 is molded out of a transparent resin to match with the window portions 80a. A protrusion 82a is formed on the top of the windowshield 82 for mounting purposes. A tail lamp member 83 consists of a rod made from a transparent resin, the rod having a rectangular cross section. Both ends of the rod are bent rearwardly. The end surfaces of the rod form light-emitting surfaces 83a. The central portion of the rod protrudes slightly forwardly to form a light-receiving surface 83b.

As shown in FIG. 9, the four tires 81 are fixed to the ribs 80b of the body 80. The windowshield 82 is inserted into the body 80 from below and fitted into the window portions 80a. The bent portions at the ends of the tail lamp member 83 are fitted into the rectangular holes 80c in the body from inside. The light-emitting surface 83a is exposed.

The toy car 5 is built as described above. The car 5 is mounted on the movable base 27. A fitting portion (not shown) inside the body 80 is fitted over the boss 68 of the movable base 27 to make the body stationary. The car 5 is mounted on the base 27.

In this state, the portion of the LED 74 which protrudes from the cases 60 and 61 is disposed opposite to the light-receiving surface 83b of the tail lamp member 83. The exposed portion of the LED 75 is opposite to the rear window portion of the windowshield 82.

When the LED 74 lights up, the produced light passes through the tail lamp member 83 to cause the light-emitting surface 83a to emit green light. When the LED 75 lights up, the windowshield 82, especially the rear window, emits red light.

Figure 10:
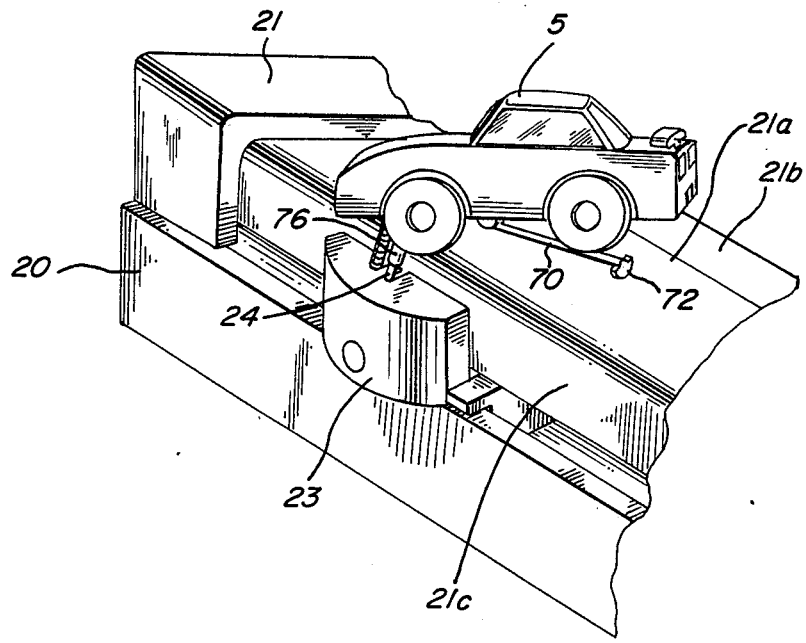
FIG. 10 is a perspective view of the toy car shown in FIG. 8, and in which the car has swung on an upper case.

The movable base 27 carrying the toy car 5 is placed on the upper case 21 as shown in FIG. 10. The cylindrical rotating boss 76 protruding from the lower surface of the case 60 is rotatably fitted in the joint shaft 24 protruding from the sensor cover 23 of the carriage 22. The friction plate 72 at the rear end of the friction rod 70 is in contact with the upper surface of the upper case 21. Thus, the base 27 and the toy car 5 are supported. The rear portion of the assembly consisting of the base 27 and the car 5 can swing right and left about the shaft 24.

The body 4 of the apparatus assembled as described thus far is shown in FIG. 9 in cross section. In the condition of FIG. 9, the toy car 5 faces forward straight. The car 5 and the base 27 are placed along the inclined surface of the upper case 21. The friction plate 72 at the rear end of the friction rod 70 lies just at the boundary between the inclined surface 21a and a horizontal surface 21b continuous with the inclined surface 21a.

Since the inclined surface 21a is tilted at an angle of 15° to the horizontal, when the rotating boss 76 that forms an angle of 20° with the normal to the underside of the base 27 is fitted into the joint shaft 24 protruding at an angle of 35° to the vertical, the underside of the base 27 makes an angle of 15° to the horizontal. Therefore, the underside is parallel to the inclined surface 21a.

The friction rod 70 is inclined further rearwardly from the underside of the base 27. The friction plate 72 at the rear end of the rod 70 is biased downward by the clip spring 73 and brought into contact with the upper case 21. Consequently, it is unlikely that the car 5 and the base 27 are moved out of position due to friction of contacting portions.

The joint shaft 24 to which the movable base 27 is pivoted is rigidly fixed to the sensor cover 23. The cover 23 extends outwardly through the opening in the cases 20, 21 from the carriage 22. As the carriage 22 moves from side to side, the cover 23 moves along the side surface 21c in front of the recess in the upper case 21.

Thus, when the carriage 22 moves, the toy car 5 coupled to the movable base 27 is caused to move the rotating boss 76 by the joint shaft 24, the boss 76 being located at the front of the car 5. The rear of the car 5 does not follow, because the friction plate 72 makes a frictional contact with the upper case 21. The car 5 swings about the shaft 24, trailing its rear.

Assuming that the carriage 22 moves to the right, the front of the car 5 shifts to the right. The rear follows the front while swinging to the left. Since the car 5 swings about the joint shaft 24 tilted at an angle of 35° to the vertical, when the car faces just forward, the rear of the movable base 27 which was parallel to the inclined surface 21a of the upper case 21 moves away from the inclined surface 21a.

This condition is shown in FIG. 10, where the rear of the toy car 5 is raised above the inclined surface 21a. Since the rear end of the friction rod 70 is always biased downward by the clip spring 73, the friction plate 72 mounted at the rear end moves upward while making contact with the inclined surface 21a. Therefore, the angle formed between the underside of the movable base 27 and the rod 70 increases. The biasing force exerted by the clip spring 73 decreases. The friction force produced between the friction plate 72 and the inclined surface 21a decreases.

The angle between the movable base 27 and the friction rod 70 is limited below a given angle by the stopper 71a and so the car 5 is allowed to rotate within a given range from +20° to −20°.

The car 5 is maintained swung only when the carriage 22 is moving. When the carriage 22 comes to a halt, the friction produced between the friction plate 72 and the inclined surface 21a is small as mentioned above while the car is in a swung posture. In this state, the rear of the car 5 easily falls along the inclined surface 21a by its own weight. Then, the car 5 faces forward. At this time, the clip spring 73 produces maximum friction between the friction plate 72 and the inclined surface 21a to prevent the rear of the car 5 from swinging.

In this way, when the carriage 22 is moving to the right, the car 5 moves while its rear swings to the left. Then, the car comes to a stop and faces forward automatically. Conversely, while the carriage 22 is shifting to the left, the car 5 makes a movement such that its rear swings to the right. Then, it stops and faces forward. The angle through which the car rotates left or right varies, depending on the speed of the carriage 22. The maximum angle is 20 degrees as described already.

Figure 11:
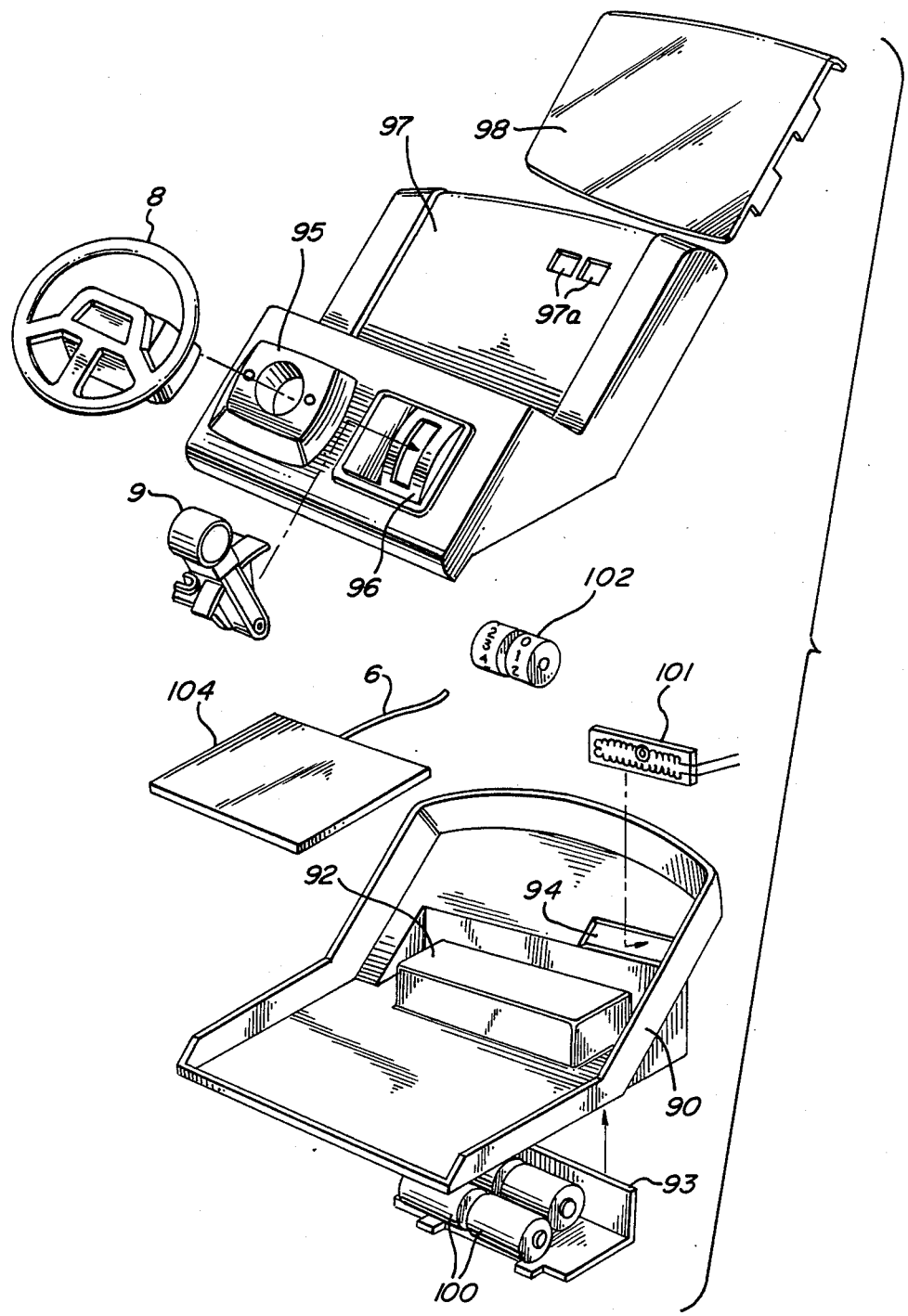
FIG. 11 is a partially cutaway exploded perspective view of a manual control unit.
Figure 12:
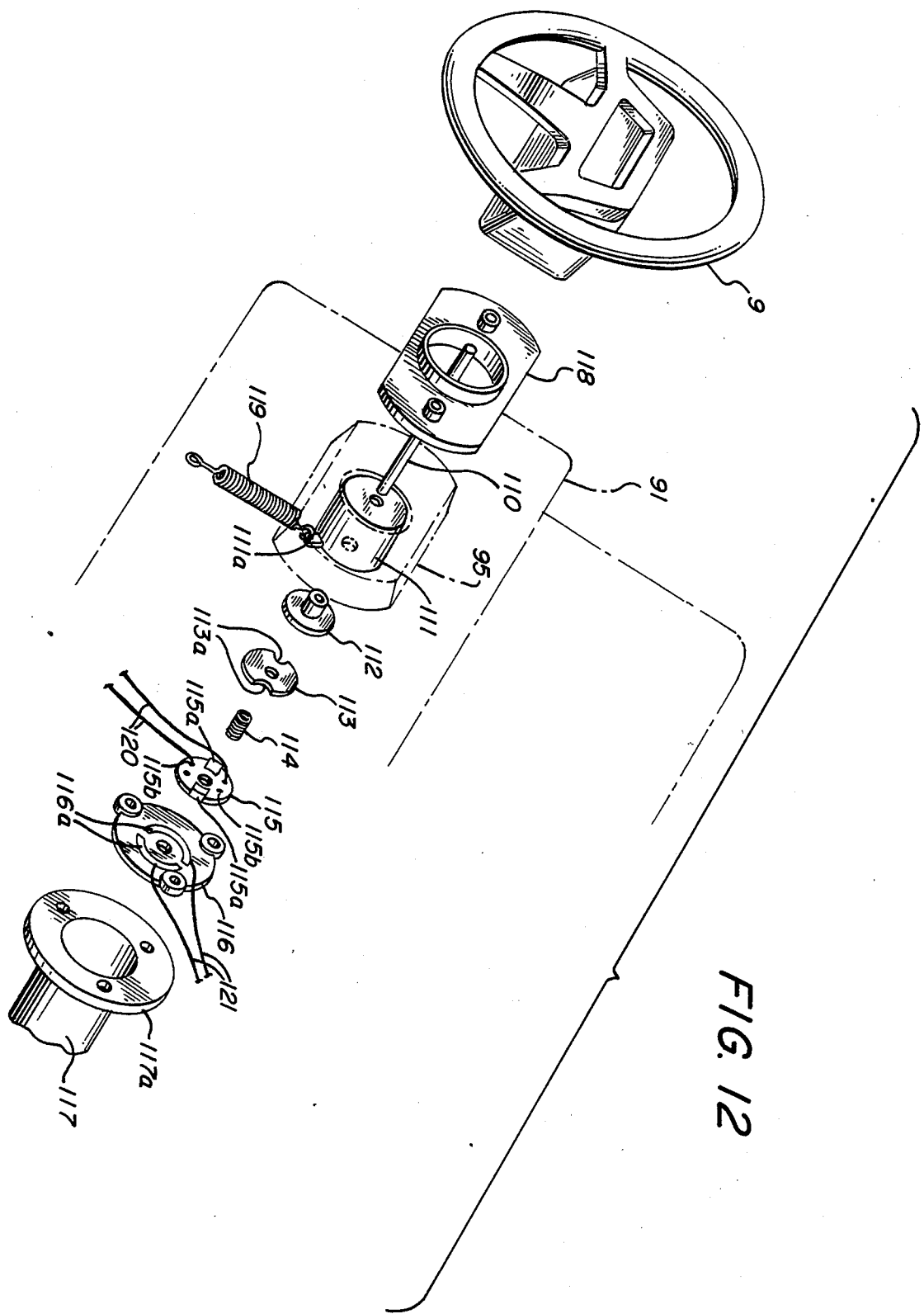
FIG. 12 is an exploded perspective view of a rotating mechanism connected with the steering wheel of the manual control unit shown in FIG. 11.
Figure 13:
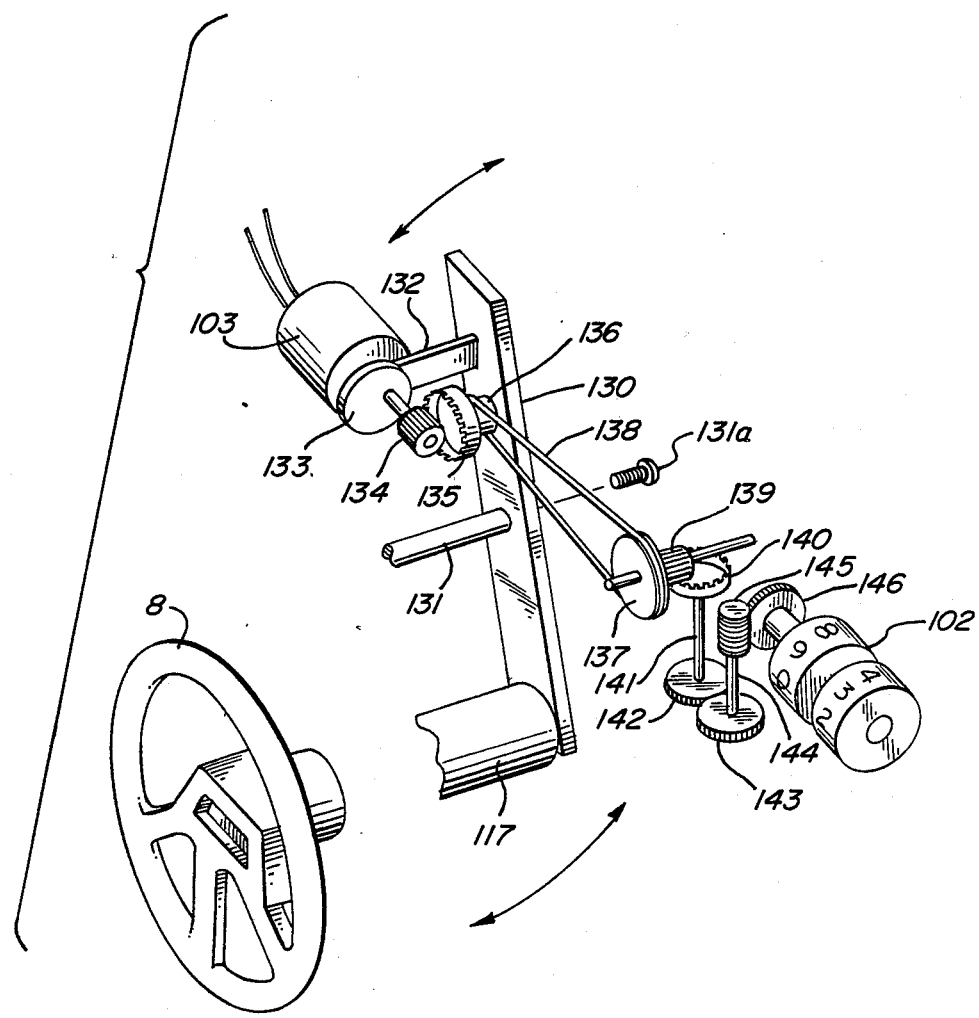
FIG. 13 is a perspective view of a mechanism mounted in the manual control unit shown in FIG. 11 for swinging the steering wheel and operating a counter.

The manual control unit 7 is now described in detail by referring to FIGS. 11–13. FIG. 11 is a partially cutaway schematic exploded perspective view of the control unit 7. This unit comprises a lower case 90 and a controller case 91 that is mounted on the lower case 90. The lower case 90 is provided with an opening defined by a front mild slope and a rear steep slope. A box 92 in which batteries 100 are inserted is formed at the lower end of the steep slope. After the batteries 100 are inserted, a cover 93 is fitted over the box 92.

The side wall of the lower case 90 which is located above the box 92 is provided with a rectangular hole 94. A variable resistor 101 for speed adjustment is fitted into the hole 94 from inside. The sliding knob of the resistor is exposed to enable one to adjust the resistance value.

The controller case 91 has a hole 95 at a front left position and a slot 96 at a front right position. The steering wheel 8 is loosely inserted in the hole 95. The selector lever 9 is mounted in the slot 96 so as to be swingable back and forth. A panel 97 including a counter is formed near the rear of the case 91. A transparent cover 98 is mounted over the panel 97 having a row of rectangular holes 97a. The counter, indicated by 102, is installed inside the panel 97 to display the digits of the counted number. The counter 102 is driven by an electric motor 103 (described later) which is mounted in the case.

A main base 104 is mounted in the case. One end of the cord 6 extending from the body of the apparatus 4 is connected to the base 104. The selector lever 9 acts as a main switch. When the lever is in its forward position, the power is off. When the lever is in its rear position, the power is on.

Three positions of the steering wheel 8, i.e., neutral position, right position, and left position, can be detected. The structure of the wheel 8 is now described in detail by referring to FIG. 12.

A wheel shaft 110 protrudes from the center of the steering wheel 8, extends through the center of a rotating drum 111, extends through a connector 112 and a support element 113, and protrudes forward. These wheel 8, rotating drum 111, connector 112, and the support element 113 are all fitted over the shaft 110. The portion of the shaft 110 which is located ahead of the support element 113 extends through the center of a compression spring 114, through the center of a movable switch member 115, and through the center of a stationary switch member 116 fixed to a flange 117a at the front end of a cylindrical rocking member 117. Therefore, the stationary swich member 116 is prevented from rotating.

The support element 113 firmly fixed to the steering wheel 110 has two notches 113a formed in the outer surface of a disk. The notches 113 are symmetrically arranged. The movable switch member 115 is disposed on the opposite side of the compression spring 114 from the support element 113. Protrusions 115a are formed on the movable switch member 115 in an opposite relation to the notches 113a. The protrusions 115a are fitted in the notches 113a.

When the steering wheel 8 is rotated, the wheel shaft 110 rotates the support element 113. Then, the element 113 turns the movable switch member 115, because the protrusions 115a on the switch member 115 are fitted in the notches 113a.

A pair of symmetrically arranged contacts 115b are mounted near the outer fringe of the movable switch member 115. A pair of opposite small metal members 116a are attached to the surface of the stationary switch member 116 which is in contact with the movable switch member 115. The metal members 116a are shaped into a semicircular form and able to make contact with the contacts 115b.

Figure 18:
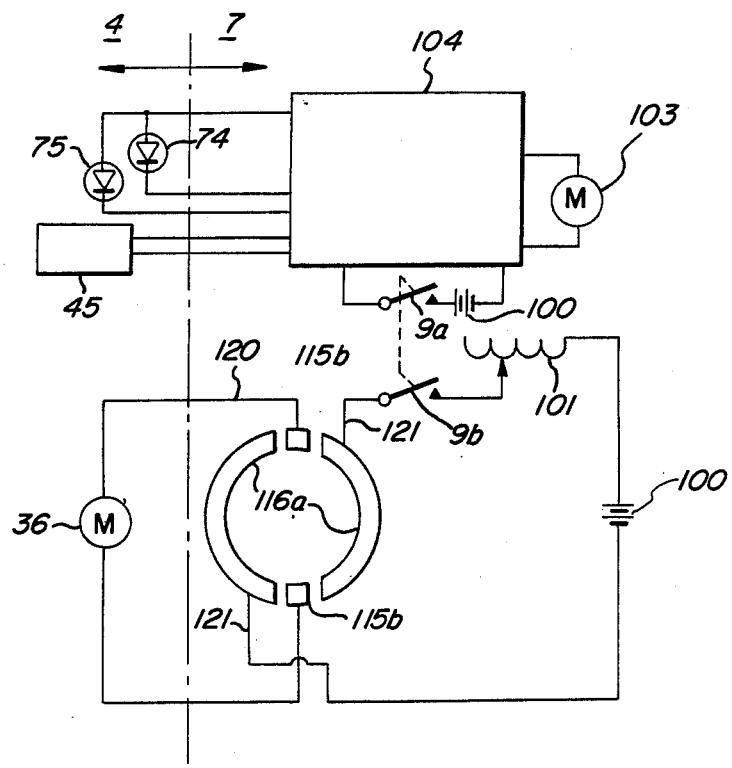
FIG. 18 is a circuit diagram of the electric system of the game machine shown in FIG. 1.
Figure 19:
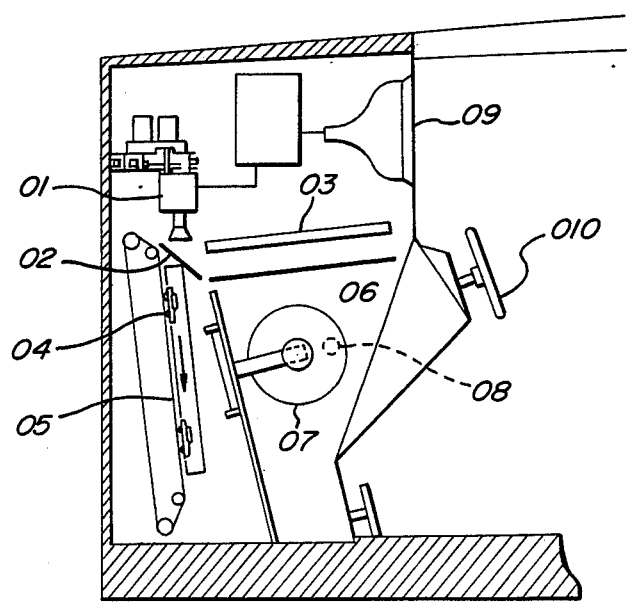
FIG. 19 is a side elevation of a conventional drive game machine.

When the steering wheel 8 is in its neutral position as shown in FIG. 18, the contacts 115b on the movable switch member 115 are vertically spaced from each other, i.e., one is in the highest position, while the other is in the lowest position. In this state, the contacts 115b are disposed between the right and left metal members 116a on the stationary switch member 116. Thus, the control unit is off.

When the wheel 8 is rotated to the right, the upper contact 115b on the movable switch member 115 makes contact with the right metal member 116a, whereas the lower contact 115b makes contact with the left metal member 116a. Conversely, when the wheel 8 is rotated to the left, the upper contact 115b and the lower contact 115b make contact with the left metal member 116a and the right metal member 116a, respectively.

The rotating drum 111 of the steering wheel constructed in this way is loosely inserted in the hole 95 formed in the controller case 91. A presser element 118 is pressed against the drum 111 and rigidly fixed to the inner surface of the hole 95. Accordingly, the presser member 118 prevents the rotating drum 111 from being thrown outwards and maintains constant the force with which the compression spring 114 biases the movable switch member 115 forward. This ensures that a switch is made between the movable switch member 115 and the stationary switch member 116.

The rotating drum 111 has an engaging portion 111a at the lower end of the outer periphery. A part of the engaging portion 111a protrudes. A tension spring 119 is mounted between a part of the controller case 91 and the engaging portion 111a.

When the steering wheel 8 is not turned and is free, the tension spring 119 maintains the wheel 8 in its neutral position. If the wheel is rotated in either direction, the spring 119 stretches to produce a force to bias the wheel 8 into its original position.

Electric wires 120 extend from the contacts 115b on the movable switch member 115, and are connected via the cord 6 to the aforementioned motor 36 (FIG. 4) of the apparatus body 4. Electric wires 121 extend from the metal members 116a on the stationary switch member 116, and are connected to the switch portion of the selector lever 9 and to the batteries 100 as described later by referring to FIG. 18.

In the present example, the steering wheel 8 on the annual control unit 7 is rocked in the same manner as an actual steering wheel. A mechanism for its rocking movement is next described by referring to FIG. 13, where a support rod 131 is fixed to a resinous board 130. The center of the board 130 is held substantially at one point with a screw 131a. One end of the cylindrical rocking member 117 bears against one of the board 130. Since the rocking member 117 is slightly pushed forward, the board 130 is slightly resiliently curved between the central position at which it is fixed and the position at which the rocking member 117 bears on the board.

A connector rod 132 extends vertically from the vicinity of the other end of the board 130. The front end of the rod 132 pushes the protruding base portion of the rotating shaft of the motor 103 such that the front end does not get off the base portion. That is, the board 130 slightly deforms resiliently. The restoring force presses the connector rod 132 against the motor 103.

An eccentric flywheel 133 is mounted to the rotating shaft of the motor 103. A pinion 134 is fitted over the front end of the protruding shaft of the motor. When the motor 103 is driven, the flywheel 133 turns, so that the motor 103 revolves around an axis. The revolution of the motor 103 is transmitted via the connector rod 132 to the board 130. As a result, one end of the board 130 rocks back and forth as indicated by the arrows.

The board 130 is held substantially at its one central point and always resiliently deformed. The rocking movement produced at the end is transmitted to the other end. Then, the cylindrical rocking member 117 rigidly fixed to the other end rocks back and forth. Since the rocking member 117 is connected to the steering wheel 8 as mentioned previously, the rocking movement is transmitted to the wheel 8.

A crown gear 135 is in mesh with a pinion 134 that is fitted over the front end of the rotating shaft of the motor 103. A belt 138 is trained between pulleys 136 and 137, the pulley 136 being integral with the crown gear 135. A gear 139 is mounted integrally with the pulley 137. A crown gear 140 is fitted over the front end of a rotating shaft 141 extending vertically. The gear 140 is in mesh with the gear 139. A gear 143 is in mesh with a gear 142 fitted over the lower end of the shaft 141. The gear 143 is fitted over the lower end of a rotating shaft 144 extending parallel to the shaft 141. A worm gear 145 is fitted over the upper end of the shaft 144. A gear 146 mounted on the operating shaft of the counter 102 is in mesh with the worm gear 145.

When the motor 103 is driven to rotate the pinion 134, the crown gear 135 in mesh with the gear 134 rotates with the pulley 136. Then, the pulley 137 is rotated with the gear 139 via the belt 138 trained around the pulley 136. The crown gear 140 in mesh with the gear 139 is rotated with the shaft 141 and also with the gear 142. The gear 143 in mesh with the gear 142 is rotated with the shaft 144 and the worm gear 145. Rotation of the worm gear 145 actuates the counter 102 via the gear 146. A drum displaying digits is appropriately rotated to count the revolution. The belt 138 is mounted in the power transmission system as described above and so the rocking movement of the motor 103 does not directly affect the transmission mechanism for the counter 102. The digits on the counter 102 are displayed within the panel 97 of the controller base 91. The internal structure of the manual control unit 7 is built as described thus far.

The structure of the joint 3 for mounting the apparatus body 4 to the screen of the TV set 1 is now described by referring to FIGS. 14 and 15. An L-shaped adjusting bar 150 has a rectangular cross section. A sliding member 151 is inserted in the horizontal portion of the bar 150 so as to be slidable back and forth. A suction cup 152 is rigidly fixed to the low end surface of the sliding member 151. A screw 153 having a protruding knob 153a is screwed to the upper end of the sliding member 151. The front end of the screw 153 can reach the adjusting bar 150 extending through the sliding member 151. By tightening the screw 153, the front end of the screw 153 is pressed against the bar 150 to fix the sliding member 151 to the bar 150. Consequently, the sliding member 151 can be fixed at an adequate horizontal position on the adjusting bar 150.

A joint bar 154 taking the form of a hollow rod is inserted in the adjusting bar 150 so as to be slidable vertically. A screw 155 having a knob 155a is screwed to the upper end portion of the bar 154 in such a way that the knob 155a protrudes rearward. By tightening the screw 155, the front end of the screw 155 is pressed against the adjusting bar 150 to fix the joint bar 154 to the bar 150. Hence, the bar 154 can be rendered stationary at an appropriate height.

The upper half of a tubular member 156 is fitted in the lower end of the joint bar 154 and fixed with a screw 157. A compression spring 158 is mounted in the lower half of the tubular member 156. The upper end of the spring 158 bears on a solid central portion of the tubular member 156, while the lower end abuts against the sliding member 159. A horizontally extending pivot 160 is held to the lower end of the tubular member 156 and shifted slightly rearward. A hook member 161 of an L-shaped cross section is pivotally mounted to the pivot 160 and has an inner member 162. The lower end surface of the sliding member 159 bears on the upper end surface of the inner member 162.

Referring particularly to FIG. 14, the compression spring 158 causes the sliding member 159 to downwardly push the portion of the inner member 162 which is located ahead of the pivoted portion. The contact surface of the inner member 162 curves downwardly toward the forward direction. The lower end fringe is cut and anchored to a stopper 163 protruding from the inner surface of the tubular member 156. One straight portion of the hook member 161 is placed horizontally, while the other straight portion protrudes vertically from the rear of the tubular member 156. The lower end fringe of the front side wall of the lower case 20 of the apparatus body 4 is engaged in the space between this vertical straight portion of the hook member 161 and the tubular member 156. Thus, the body 4 is held.

Each joint 3 is constructed as described thus far. The joints 3 are disposed on opposite sides of the screen of the TV set 1. The adjusting bar 150 is so placed that its horizontal portion extends forward along the upper surface of the TV set 1. The sliding member 151 is caused to slide forward or rearward and fixed at an appropriate position by tightening the screw 153. Then, the suction cup 152 is attahced to the upper surface of the TV set 1 to hold the joints 3. Subsequently, each joint bar 154 is caused to slide upward or downward to place the hook member 161 disposed at the lower end at an adequate height. Thereafter, the bar 154 is made stationary by tightneing the screw 155. The apparatus body 4 is anchored to the right and left hook members 161. The hook members 161 are so supported that they cover the horizontal lower end of the screen of the TV set.

Depending on the kind of television set, the contour of the television set differs. However, the apparatus body 4 can be stably held to almost every kind of television set by appropriately sliding the sliding member 151 and the joint bar 154 to ajust their positions.

If an external force should be applied to the rear fringe of the held apparatus body 4, the hook member 161 would swing about the pivot 160 against the action of the compression spring 158 as shown in FIG. 15, whereby the apparatus would be relieved from the force. In this way, the apparatus is prevented from becoming damaged. If the applied force disappears, the compression spring 158 returns the hook member 161 to the condition shown in FIG. 14.

Figure 16:
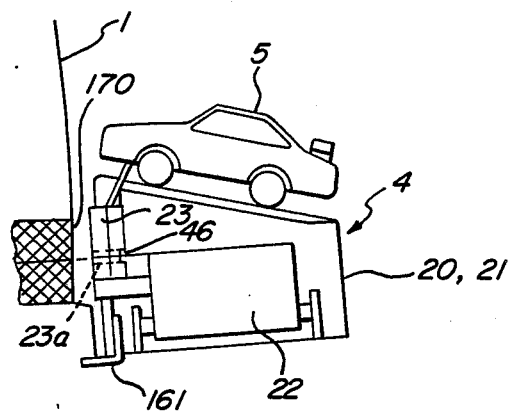
FIG. 16 is a side elevation of the body of the apparatus and the television set shown in FIG. 1, for showing their positional relation.

FIG. 16 shows the positional relation between the TV screen and the apparatus body 4. The apparatus body 4 covers the lower end of the TV screen. The front surface of the sensor cover 23 of the carriage 22 faces the TV screen. Accordingly, the light guide portion 23a extending to the front surface of the cover 23 faces the lower end of the TV screen. Consequently, the optical sensor 46 is capable of detecting the emission of light from the screen.

Figure 17:
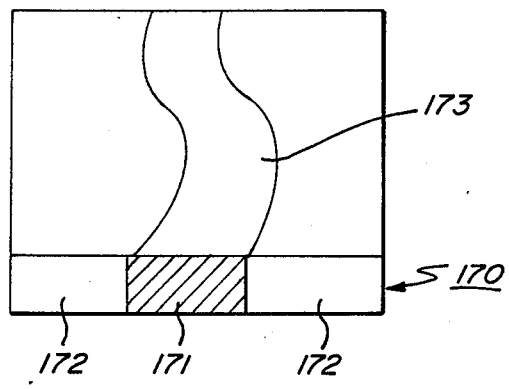
FIG. 17 is a front elevation of the screen of the television set shown in FIG. 1, for showing one example of image displayed on the screen.

A prerecorded video tape is played back on the TV set 1 by the video tape recorder 2 to create images. As shown in FIG. 17, a horizontal belt-like image 17 is superimposed on the lower end portion of the displayed image. The image 170 contains a black continuous road 171. Flickering portions 172 on opposite sides of the black image 171 go on and off at suitable intervals of time. The black image portion 171 moves right and left according to conditions of a videotaped road. The superimposition is such that if a car traveling in the opposite direction or a preceding car exists on the road, this portion flickers. The aforementioned optical sensor 46 detects the superimposed portion 170 and discriminates the black portion 171 from the flickering portions 172.

FIG. 18 is an electric circuit diagram of the present apparatus. In this figure, the left side of the dot-and-dash line shows the apparatus body 4. The right side shows the manual control unit 7. The main base 104 of the control unit 7 is connected to the motor 103 as described above and also to the LEDs 74, 75 mounted on the toy car 5 of the body 4 via the cord 6. Further, the base 104 is connected with the sensor base 45 mounted on the carriage 22. Batteries 100 which supply electric power to the main base 104 are connected with the base 104 via the switch 9a acutated by the selector lever 9. One of the contacts 115b of the movable switch member 115 is connected with the motor 36 of the apparatus body 4. One of the metal members 116a of the stationary switch member 116 is connected to the switch 9b of the selector lever 9, while the other is tied to the cathode of another battery 100. The variable resistor 101 is connected between the switch 9b and the anode of the battery 100.

In the operation of the circuit configuration constructed as described thus far, when the selector lever 9 is pushed forward to close the switches 9a and 9b, the main base 104 is energized. Thus, it is ready to drive the motor 36. It is now assumed that the steering wheel 8 is in its neutral position. In this state, the contacts 115b are not in contact with the metal members 116a. If the wheel 8 is turned to the right, the upper contact 115b and the lower contact 115b come contact with the right metal member 116a and the left metal member 116a, respectively. The voltage across the battery 100 is applied to the motor 36 to rotate it in a forward direction. Therefore, the car 5 shift to the right on the apparatus body 4.

Conversely, if the steering wheel 8 is rotated to the left, the upper contact 115b and the lower contact 115b make contact with the left metal member 116a and the right metal member 116a, respectively. The polarity of the voltage applied to the motor 36 is reversed to thereby reverse the motor 36. At this time, the car 5 moves to the left on the apparatus body 4. The voltage applied to the motor 36 can be varied by changing the resistance value of the variable resistor 101. Therefore, the speed at which the toy car 5 shifts right or left can be appropriately adjusted by varying the rotational speed of the motor 36. When the switch 9a of the selector lever 9 is closed, the green LED 74 lights up.

The human player operates the steering wheel 8 to move the toy car 5 along the displayed road 173 while watching the screen of the TV set 1. When the car 5 is opposite to the road 173, the optical sensor 46 is opposite to the black portion 171 of the superimposed portion 170. At this time, the motor 103 does not respond at all. If the player's driving operation fails and the car 5 comes out of the road 173, then the optical sensor 46 faces the flickering portions 172 of the superimposed portion 170. Then, a signal is sent to the main base 104, which causes voltages to be applied to the red LED 75 and the motor 103. The LED 75 lights up, and the motor 103 rotates.

If the motor 103 is driven, the rocking mechanism rocks the steering wheel 8 and produces vibrating sound. Simultaneously, the counter 102 operates, and the total count is reduced.

If a car moving forward or in the opposite direction collides with the toy car 5, then the red LED 75 lights up in the same manner. The wheel 8 is swung, and the total count of the counter 102 decreases.

If the car must come to a halt because of the presence of a stop signal, then the whole superimposed portion 170 flickers. In this case, the player operates the selector lever 9 to deactivate the switch, for stopping the car. If this operation is not performed, then the motor 103 is driven to rock the wheel 8 and to reduce the total count of the counter 102.

Whenever the player fails, e.g., the car 5 goes out of the road, it collides against another car, and it fails to stop when it should come to a stop, the total count obtained by the counter 102 decreases. The game can be played until the total count decreases down to zero.

In the present example, when the signal from the optical sensor 46 is handled, a change from black to white on the screen is monitored. If the rate of change in the amount of light falling on the sensor 46 is large, it is detected.

The front side of the optical sensor 46 is usually open. At this time, the sensor does not respond. It produces a signal only when a sudden increase in the light amount occurs as encountered when black is switched to white, or the image flickers. In this fashion, the sensor is prevented from being inadvertently operated.

As described thus far, in the present example, the image displayed on the TV screen can be obtained by playing back a video tape which was recorded by taking scenes from the driver's seat when an actual car was driven. Consequently, the player feels as if he or she drove an actual car.

Games can be easily played in homes by installing the apparatus body 4 on a domestic TV set with the joints 3. Further, the apparatus is portable, and games can be played at ease. Since the apparatus is not a large-scale apparatus unlike apparatuses installed in game machine centers, the cost is quite low. However, a sufficient amount of reality is offered. That is, the player operates the toy car while watching actual roads. If the car goes out of the road or collides with another car, the steering wheel 8 is swayed. In this way, the game is very exciting.

In addition, a feeling of depth is given, because the toy car 5 is located in front of the screen. Therefore, the player must drive the car, taking the distance along the road into account. Hence, the game can be a sophisticated simulation.

Road conditions can be easily changed by replacing the video tape with another. If a game is repeatedly played on the same road, the player will be get tired. With the novel apparatus, this can be avoided.

In the present example, the intervals at which the flickering portions 172 of the superimposed portion 170 light up are regular. The intervals may be varied between the outside of the road and portions corresponding to other cars. These intervals may be detected. Correspondingly, the wheel may be rocked. The motor 103 may be driven according to the different intervals.

Specifically, when the car collides with another car, the motor 103 is rotated at a higher speed to rock the steering wheel to a larger extent. The total count of the counter 102 is reduced by a larger value.

Where the toy car goes out of the road, as it moves away from the road, the flickering portions may flicker at shorter intervals. If the car goes out of the road slightly, the wheel is swung a little. If the car goes out of the road greatly, the wheel is swung to a larger extent.

In the example described thus far, the toy car 5 is simply moved from side to side. The invention can also be applied to a toy airplane. As an example, a toy airplane is so held that it can move up and down and right and left along a TV screen. A certain image is superimposed on the screen portion covered wtih the toy airplane. The wheel may be operated so that the airplane may follow the image. This provides the possibility of a three-dimensional flight control game.

The novel apparatus can be readily installed on a domestic TV set to play games. Videoed images of actual scenes can be played back on the TV screen by a video tape recorder, and reality is offered. The system functions as simulator. That is, the player feels as if he or she operated a real car or other vehicle. Since the toy vehicle moves along the TV screen, a feeling of depth is obtained, thus increasing reality.

What is claimed is:

1. In a video system having a monitor screen to provide images, the improvement comprising:
   means for attachment adjacent the monitor screen for providing a simulated vehicle that can be moved relative to the screen;
   means for compound movement of the simulated vehicle, both across the screen and also pivoting the vehicle, so that a rear portion of the vehicle can move towards and away from the screen to simulate turning movements of the simulated vehicle relative to images on the monitor screen, and
   means for permitting an operator to control the simulated vehicle movement, including an operator control member having an upper portion which can be manipulated by the operator and means connected to the lower portion of the operator control member for creating a vibration movement of the operator control member in response to certain predetermined actions of the operator, whereby the operator will feel an adverse reaction in the operator control member.

2. The video system of claim 1 wherein the means for attachment includes an inclined support member relative to the monitor screen for supporting the simulated vehicle and a pair of enlongated mounting joints for suspending the support member adjacent a bottom portion of the monitor screen.

3. The video system of claim 2 further including a low friction member cantilevered from the simulated vehicle to contact the inclined surface and to raise the rear of the simulated vehicle relative to the inclined surface.

4. The video system of claim 1 wherein the means for attachment includes a hollow support member for supporting the simulated vehicle and a movable carriage member with a motor for movement within the hollow support member, the carriage member being connected to the simulated vehicle.

5. The video system of claim 1 further including means for optically determining the relative position of the simulated vehicle to the images on the monitor screen.

6. The video system of claim 5 further including lights on the simulated vehicle that can be activated.

7. The video system of claim 6 wherein the simulated vehicle is a car.

8. The video system of claim 7 wherein the operator control member is a driver's wheel.

9. In a video system having a monitor screen to provide images, the improvement comprising:
   means for attachment adjacent the monitor screen for providing a simulated vehicle that can be moved relative to the screen, including an inclined support member relative to the monitor screen for supporting the simulated vehicle and a pair of elongated mounting joints for suspending the support member adjacent a bottom portion of the monitor screen;
   means for compound movement of the simulated vehicle, both across the screen and also pivoting the vehicle, so that a rear portion of the vehicle can move towards and away from the screen to simulate turning movements of the simulated vehicle relative to images on the monitor screen, and
   means for permitting an operator to control the simulated vehicle movement.

10. In a video system having a monitor screen to provide images, the improvement comprising:
    means for attachment adjacent the monitor screen for providing a simulated vehicle that can be moved relative to the screen, including a hollow support member for supporting the simulated vehicle and a movable carriage member with a motor for movement within the hollow support member, the carriage member being connected to the simulated vehicle;
    means for compound movement of the simualted vehicle, both across the screen and also pivoting the vehicle, so that a rear portion of the vehicle can move towards and away from the screen to simulate turning movements of the simulated vehicle relative to images on the monitor screen, and
    means for permitting an operator to control the simulated vehicle movement.

11. In a video system having a monitor screen to provide images, the improvement comprising:
    means for attachment adjacent the monitor screen for providing a simulated vehicle that can be moved relative to the screen;
    a light member on the simulated vehicle that can be activated;
    means for optically determining the relative position of the simulated vehicle to the image on the monitor screen;
    means for compound movement of the simulated vehicle, both across the screen and also pivoting the vehicle, so that a rear portion of the vehicle can move towards and away from the screen to simulate turning movements of the simulated vehicle relative to images on the monitor screen, and
    means for permitting an operator to control the simulated vehicle movement, including an operator control member and means for creating a vibration movement of the operator control member in response to certain predetermined actions of the operator, whereby the operator will fee an adverse reaction in the operator control member.

* * * * *